United States Patent [19]

Kunugihara et al.

[11] Patent Number: 5,078,845

[45] Date of Patent: Jan. 7, 1992

[54] PROCESS FOR PREPARING AN ELECTRODE FOIL FOR USE IN ALUMINUM ELECTROLYTIC CAPACITORS

[75] Inventors: Hiromu Kunugihara; Hiroshi Takahashi; Ryoichi Shimatani; Nobuyoshi Kanzaki, all of Kyoto, Japan

[73] Assignee: Matsushita Electric Industrial Co., Ltd., Osaka, Japan

[21] Appl. No.: 617,448

[22] Filed: Nov. 21, 1990

Related U.S. Application Data

[63] Continuation of Ser. No. 398,039, Aug. 24, 1989, abandoned.

[30] Foreign Application Priority Data

Aug. 24, 1988 [JP] Japan ................. 63-210272

[51] Int. Cl.$^5$ ............................................. C25D 11/18
[52] U.S. Cl. ................................. 205/153; 205/174; 205/199
[58] Field of Search ............... 204/27, 28, 37.6, 38.3, 204/42

[56] References Cited

U.S. PATENT DOCUMENTS

| | | | |
|---|---|---|---|
| 3,920,525 | 11/1975 | Fromson | 204/28 |
| 4,113,579 | 9/1978 | Randall, Jr. et al. | 204/33 |
| 4,481,084 | 11/1984 | Chen et al. | 204/42 |
| 4,537,665 | 8/1985 | Nguyen et al. | 204/29 |

Primary Examiner—John F. Niebling
Assistant Examiner—William T. Leader
Attorney, Agent, or Firm—Panitch Schwarze Jacobs & Nadel

[57] ABSTRACT

A process for preparing an electrode foil for use in aluminum electrolytic capacitors is disclosed which comprises the steps of: subjecting an aluminum base foil to a first anodic treatment in an aqueous solution of oxalic acid or sulfuric acid; subjecting the base foil so treated to a second anodic treatment in an aqueous solution of boric acid or adipic acid; and immersing the base foil so treated into an aqueous solution containing phosphoric acid or a salt thereof. Also disclosed is an electrode foil prepared by this process, which comprises an aluminum base foil, an anodic oxide film disposed on the base foil, and a porous oxide film disposed on the anodic oxide film, wherein phosphate ions are adsorbed on the surface of the porous oxide film.

5 Claims, 5 Drawing Sheets

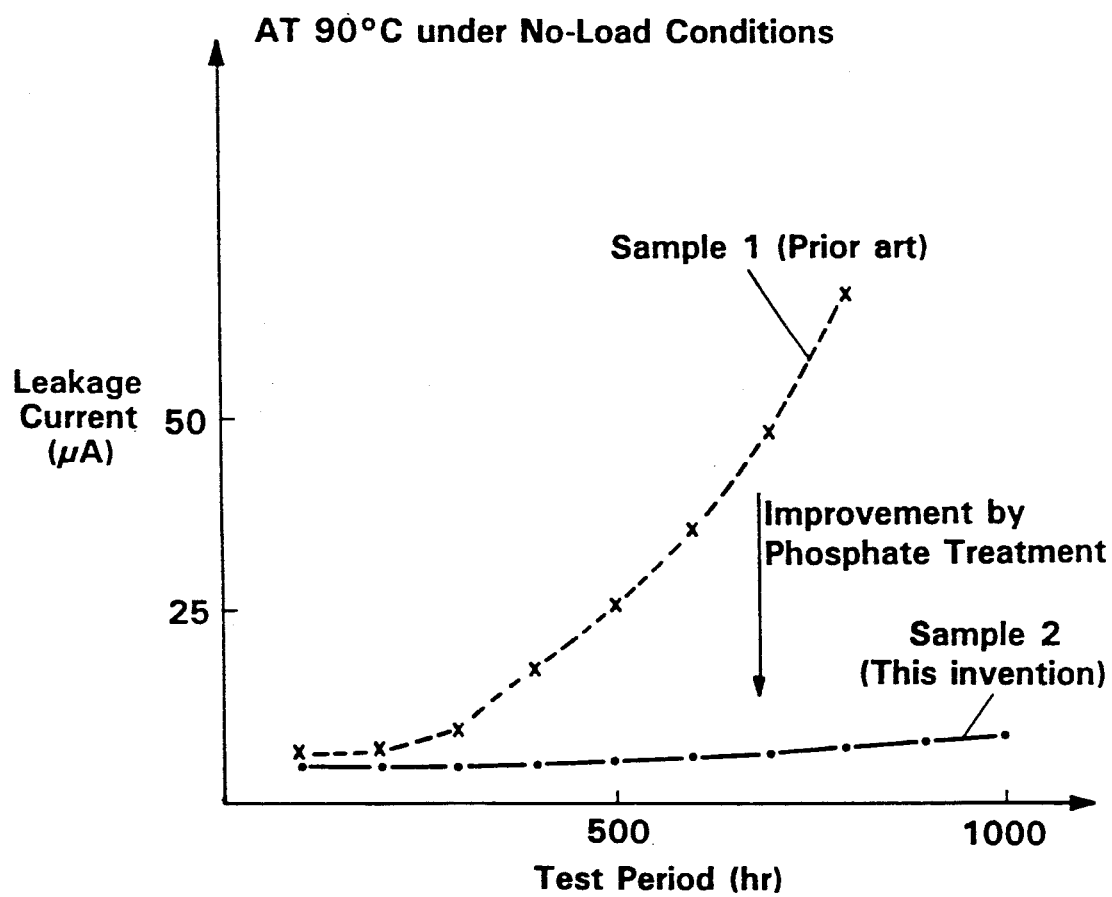

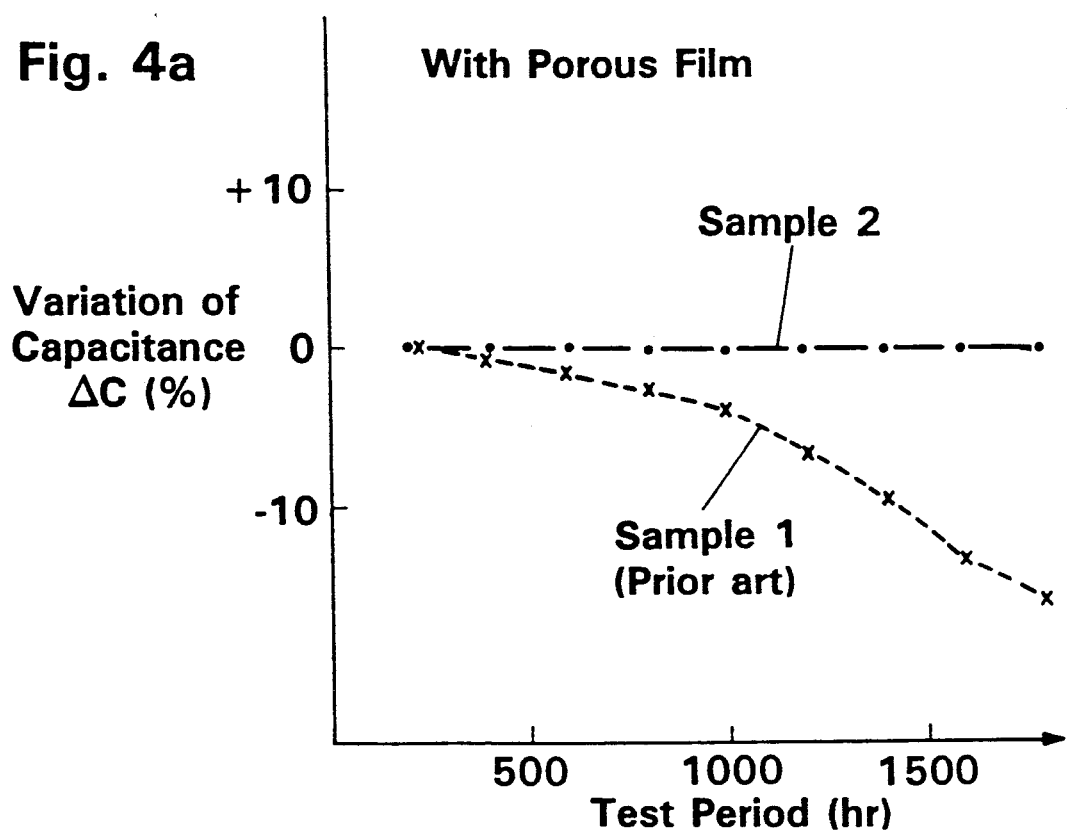
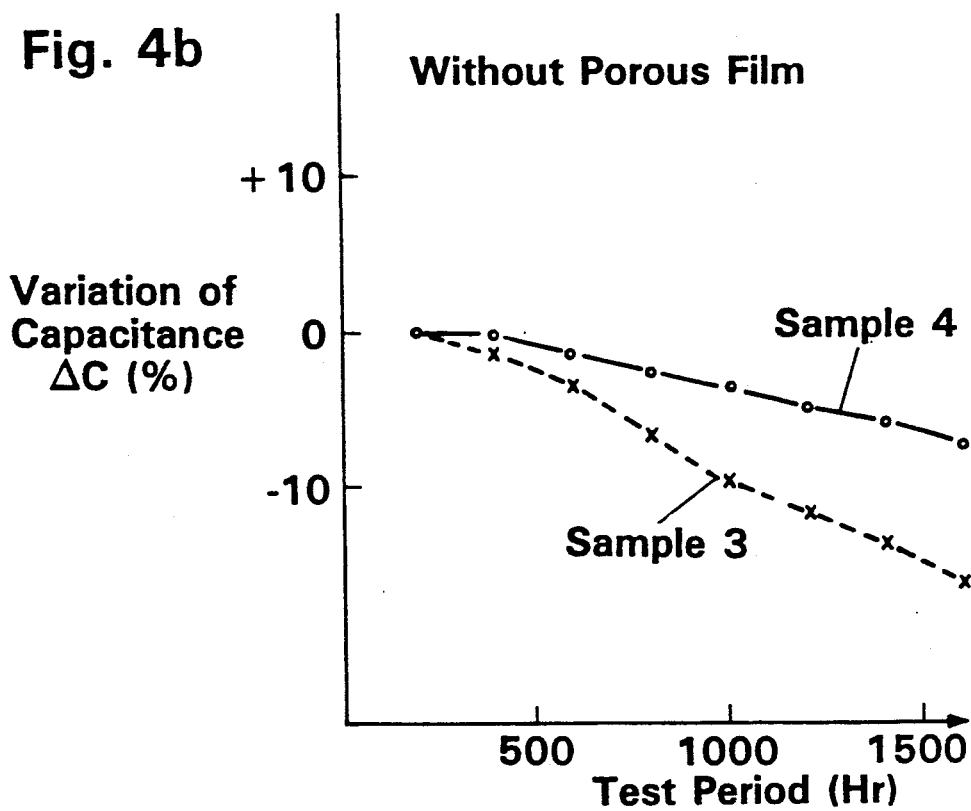

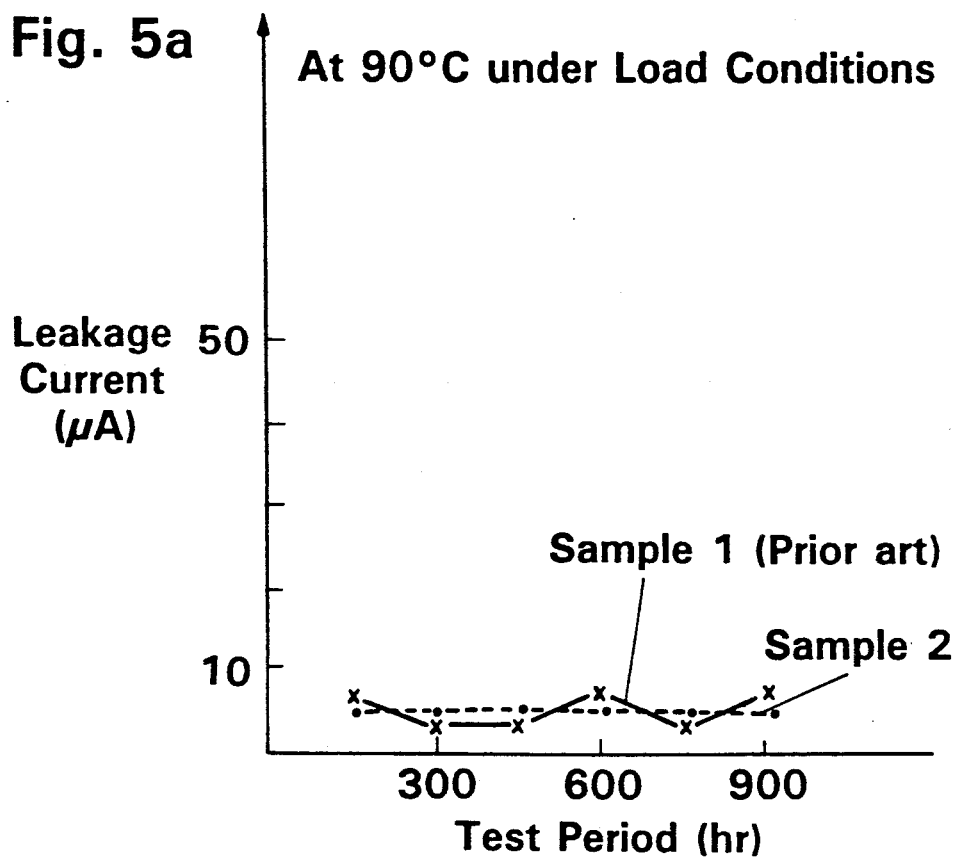
Fig. 5a — At 90°C under Load Conditions
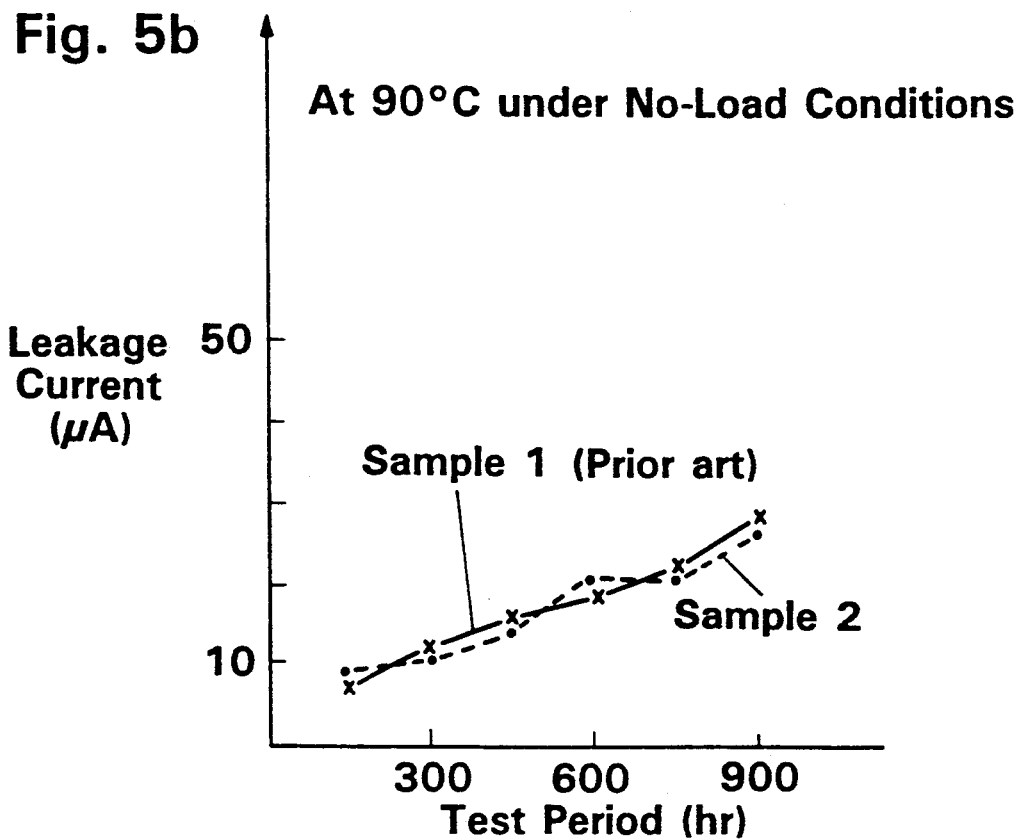
Fig. 5b — At 90°C under No-Load Conditions

PROCESS FOR PREPARING AN ELECTRODE FOIL FOR USE IN ALUMINUM ELECTROLYTIC CAPACITORS

BACKGROUND OF THE INVENTION

1. Field of the Invention

This invention relates to a process for preparing an electrode foil for use in aluminum electrolytic capacitors. This invention also relates to an electrode foil for use in aluminum electrolytic capacitors, which is prepared by this process.

2. Description of the Prior Art

Conventional aluminum electrolytic capacitors which are commonly used have been fabricated as follows. In the first step, on the coarse surface of aluminum foil which has been subjected to an etching treatment, a dielectric film is formed to yield an electrode foil. The second step consists of impregnating the electrode foil with an electrolytic solution for driving operations. Finally, the electrode foil so impregnated is wound together with a separator, resulting in an aluminum electrolytic capacitor.

In recent years, with increasing reliability and working life of electronic equipment, there has been a growing demand for aluminum electrolytic capacitors with high reliability, which are one of the important electronic parts.

Particularly, the capacitors used in charge-and-discharge circuits for welding machines, magnetizers, and the like, in which rapid charging and discharging are frequently repeated, as well as the capacitors used in inverter circuits to which an electric current with a high ripple percentage is fed, have to be driven under severe operating conditions, and therefore these capacitors are required to have extremely high reliability.

FIG. 2 shows a schematic structure of a conventional electrode foil for use in aluminum electrolytic capacitors which are used in the abovementioned charge-and-discharge circuits and high-ripple circuits. As shown in this figure, the conventional electrode foil comprises an aluminum base foil 1, an anodic oxide film 2 disposed on the base foil 1, and a porous oxide film 3 disposed on the anodic oxide film 2. This electrode foil is prepared as follows.

First, in an aqueous solution of oxalic acid, sulfuric acid, chromic acid, or the like, a constant direct current is allowed to flow between the aluminum base foil 1 and the counter electrode. By this anodic treatment, the porous oxide film 3 is formed on the surface of the aluminum base foil 1. Then, the base foil so treated is subjected to further anodic treatment in an aqueous solution of boric acid, adipic acid, or the like to form the anodic oxide film 2 between the aluminum base foil 1 and the porous oxide film 3, resulting in an electrode foil.

The anodic oxide film 2 formed by such a process has an amorphous structure in which there is no lattice mismatch as developed at the interface of crystals in the case of crystalline films. In general, the insulating characteristics of the amorphous film is less susceptible to thermal degradation because heat generation in the inside of the film can be reduced. Thus, the anodic oxide film 2 has a high withstand voltage, thereby attaining excellent resistance of electrolytic capacitors to charge-and-discharge and high ripple current.

However, in practical use, the electrolytic capacitors are driven at high temperatures for a long period of time. As a result, the anodic oxide film reacts with penetrated water which is contained in an electrolytic solution, thereby causing hydration on the surface of the film. Thus, insulating characteristics of the film is degrated by this hydration, so that the increase in leakage current eventually causes capacitor failure.

SUMMARY OF THE INVENTION

The process for preparing an electrode foil for use in aluminum electrolytic capacitors of this invention, which overcomes the above-discussed and numerous other disadvantages and deficiencies of the prior art, comprises the steps of: subjecting an aluminum base foil to a first anodic treatment in an aqueous solution of oxalic acid or sulfuric acid; subjecting the base foil so treated to a second anodic treatment in an aqueous solution of boric acid or adipic acid; and immersing the base foil so treated into an aqueous solution containing phosphoric acid or a salt thereof.

In a preferred embodiment, said aqueous solution used in the third step contains orthophosphoric acid, diammonium hydrogenphosphate, or ammonium dihydrogenphosphate.

In a preferred embodiment, wherein said aqueous solution used in the first step contains oxalic acid or sulfuric acid in a concentration of 10 to 50 g/l and is kept at a temperature of 20° to 50° C.

In a preferred embodiment, in at least one of the first and second anodic treatments, at direct current is allowed to flow between said aluminum base foil as an anode and a counter electrode.

In a preferred embodiment, said direct current is fed to the aluminum base foil by means of a feed bath containing an aqueous solution of electrolyte.

Electrode foil for use in aluminum electrolytic capacitors comprises an aluminum base foil, an anodic oxide film disposed on said base foil, and a porous oxide film disposed on said anodic oxide film, wherein phosphate ions are adsorbed on the surface of said porous oxide film.

In a preferred embodiment, said anodic oxide film is formed by anodic treatment in an aqueous solution of boric acid or adipic acid.

In a preferred embodiment, said porous oxide film is formed by anodic treatment in an aqueous solution of oxalic acid or sulfuric acid.

Thus, the invention described herein makes possible the objectives of (1) providing a process for preparing an electrode foil for use in aluminum electrolytic capacitors, by which electrode foils with high reliability are provided, thereby attaining considerable improvement in the working life and reliability of aluminum electrolytic capacitors; and (2) providing an electrode foil for use in aluminum electrolytic capacitors, in which the anodic oxide film of the electrode foil has excellent resistance to water, so that when the electrode foil is fabricated in electrolytic capacitors, hydration on the surface of the anodic oxide film with penetrated water which is contained in an electrolytic solution can be retarded.

BRIEF DESCRIPTION OF THE DRAWINGS

This invention may be better understood and its numerous objects and advantages will become apparent to those skilled in the art by reference to the accompanying drawings as follows:

FIG. 3 is of characteristic curves showing the variation of leakage current over a test period of time with respect to two samples of aluminum electrolytic capacitor of Example 1.

FIGS. 4a and 4b are of characteristic curves showing the variation of capacitance over a test period of time with respect to four samples of aluminum electrolytic capacitor of Example 2.

FIGS. 5a and 5b are of characteristic curves showing the variation of leakage current over a test period of time with regard to two samples of aluminum electrolytic capacitor of Example 3.

DESCRIPTION OF THE PREFERRED EMBODIMENTS

Figure 1:
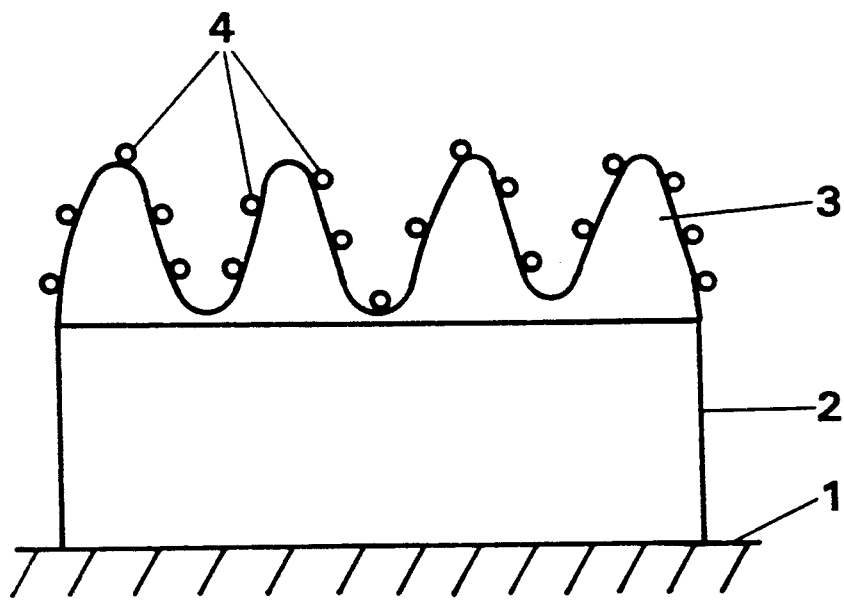
FIG. 1 is a schematic diagram showing a structure of an electrode foil prepared by a process of this invention.
Figure 2:
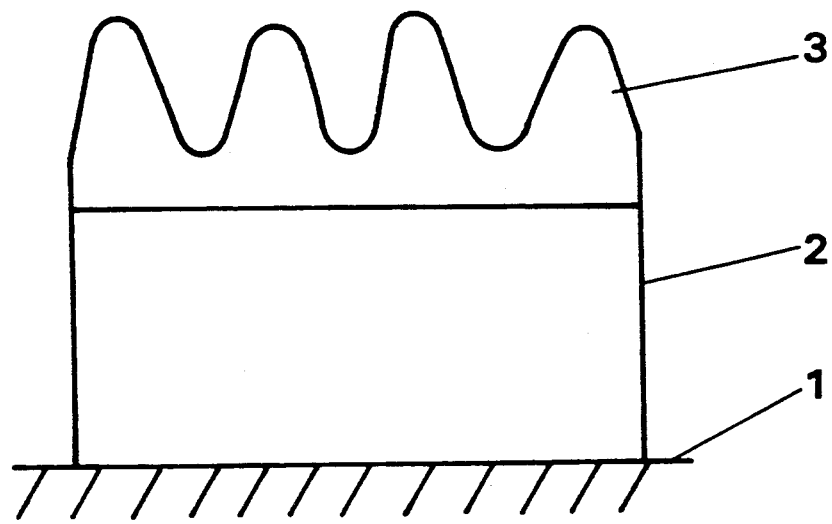
FIG. 2 is a schematic diagram showing a structure of a conventional electrode foil.

FIG. 1 shows a schematic structure of the electrode foil prepared by the process of this invention. The electrode foil comprises an aluminum base foil 1, an anodic oxide film 2 disposed on the aluminum base foil 1, and a porous oxide film 3 disposed on the anodic oxide film 2. The porous oxide film 3 is formed on the aluminum base foil 1 by anodic treatment in an aqueous solution of oxalic acid or sulfuric acid. Thereafter, the anodic oxide film 2 is formed between the aluminum base foil 1 and the porous oxide film 3 by anodic treatment in an aqueous solution of boric acid or adipic acid. The porous oxide film 3 has the significant effect of trapping phosphate ions 4 (e.g., $PO_4^{3-}$) because of its large effective surface area and microscopic irregularities on the surface. Thus, in accordance with the present invention, a greater amount of phosphate ions 4 can be adsorbed on the surface of the porous oxide film 3 which entirely covers the anodic oxide film 2, thereby attaining considerable improvement in water resistance.

The porous oxide film 3 is extremely effective for the formation of defect-free amorphous films on the aluminum base foil 1. However, the heat resistance of the porous oxide film 3 is relatively low. In this regard, the phosphate treatment of this invention can also attain considerable improvement in heat resistance.

When an electric current is fed to the aluminum foil with the porous oxide film formed thereon, a spark accident may occur because of high contact resistance. In such a case, it is preferred that the electric current is allowed to flow by means of a feed bath containing an aqueous solution of electrolyte.

EXAMPLE 1

The following Example shows the improvement in reduction of leakage current, which is attained by the process of this invention.

Sample 1 of the electrode foil was prepared as follows. An etched aluminum base foil was subjected to the first anodic treatment in an aqueous solution of oxalic acid at 30° C. at a current density of 0.3 A/cm$^2$ for 5 minutes, followed by the second anodic treatment in an aqueous solution of boric acid at 90° C. up to an electric potential of 300 $V_F$. The concentration of oxalic acid was 10 g/l and the concentration of boric acid was 100 g/l.

Sample 2 of the electrode foil was obtained by immersing the same electrode foil as sample 1 in a 1% aqueous solution of phosphoric acid at 60° C. for 2 minutes.

Each of these samples was used as an anode foil to fabricate an aluminum electrolytic capacitor. The respective electrolytic capacitors obtained were allowed to stand at 90° C. under no-load conditions, and the increase in leakage current was measured for each electrolytic capacitor. The results are shown in FIG. 3.

As can be seen from FIG. 3, the electrolytic capacitor of this invention (i.e., sample 2) gave an extremely low leakage current for a long test period of time, whereas the leakage current from the prior art electrolytic capacitor (i.e., sample 1) increased rapidly over the test period. Thus, the phosphate treatment of this invention can attain considerable improvement in reduction of leakage current.

EXAMPLE 2

The following Example shows that considerable improvement in variation of capacitance can be obtained in the case where an anodic oxide film with a porous oxide film disposed thereon is subjected to phosphate treatment, as compared with the case of an anodic oxide film without such a porous oxide film.

Samples 1 and 2 of the electrode foil were prepared in the same manner as the corresponding samples 1 and 2 of Example 1, respectively.

Sample 3 of the electrode foil was prepared by anodic treatment of an etched aluminum base foil in an aqueous solution of boric acid at 90° C. up to an electric potential of 300 $V_F$. The concentration of boric acid was 100 g/l.

Sample 4 of the electrode foil was prepared by immersing the same electrode foil as sample 3 in a 1 aqueous solution of phosphoric acid at 60° C. for 2 minutes.

Each of these samples was used as an anode foil to fabricate an aluminum electrolytic capacitor. The respective electrolytic capacitors obtained were allowed to stand at 90° C. under no-load conditions, and the variation in capacitance was measured for each electrolytic capacitor. The results are shown in FIGS. 4a and 4b.

As can be seen from FIGS. 4a and 4b, the electrolytic capacitor of this invention (i.e., sample 2) gave little variation of capacitance for a long test period of time, whereas the capacitance of the prior art electrolytic capacitor (i.e., sample 1) decreased significantly over the test period. Moreover, even when the phosphate treatment is applied, the capacitance of sample 4 of the electrolytic capacitor, which was prepared from the electrode foil without a porous oxide film, decreased gradually over the test period. Thus, the phosphate treatment of this invention can attain higher stability of capacitance in the electrolytic capacitor containing the electrode foil with a porous oxide film, as compared with the electrolytic capacitor containing the electrode foil without a porous oxide film.

Although the foregoing Example only discloses the results obtained when orthophosphoric acid was used for the phosphate treatment, similar results can also be obtained by the use of either diammonium hydrogen phosphate or ammonium dihydrogen phosphate.

The amount of phosphate ions adsorbed on the surface area was measured. The results are shown in Table 1.

TABLE 1

| Sample No. | Amount of Phosphate Ions adsorbed ($\mu g/cm^2$) |
| --- | --- |
| 1 | 0 |
| 2 | 263 |
| 3 | 0 |
| 4 | 13 |

As can be seen from Table 1, even when the same conditions are used for the phosphate treatment, the amount of phosphate ions adsorbed is approximately 20 times greater in the electrode foil with a porous oxide film (i.e., sample 2) than in the electrode foil without a porous oxide film (i.e., sample 4). One possible reason for this trend is that the porous oxide film has the significant effect of trapping phosphate ions because of its extremely porous surface, thereby attaining considerable improvement in capacitor characteristics.

EXAMPLE 3

The following Example shows for current feeding to aluminum foil which is to be treated.

Sample 1 of the electrode foil was prepared by anodic treatment in which an electric current was directly fed from the anode terminal of a power supply to this sample by means of a metallic feed roller. The preparation of this electrode foil was carried out as follows. An etched aluminum foil was subjected to the first anodic treatment in an aqueous solution of oxalic acid at 20° C. at a current density of 0.1 A/cm² for 7 minutes, followed by a second anodic treatment in an aqueous solution of boric acid at 90° C. up to an electric potential of 300 $V_F$. The concentration of oxalic acid was 30 g/l and the concentration of boric acid was 100 g/l. The final step consisted of immersion in an 1% aqueous solution of phosphoric acid at 60° C. for 2 minutes.

Sample 2 of the electrode foil was prepared in the same manner as mentioned above, except that an electric current was indirectly fed to the aluminum foil through a feed solution (e.g., an aqueous solution of ammonium adipate) which was contained in a feed bath, the anode terminal of the power supply being disposed in the feed bath.

Each of these samples was used as an anode foil to fabricate an aluminum electrolytic capacitor. The respective electrolytic capacitors obtained were allowed to stand at 90° C. under either load or no-load conditions, and the leakage current was measured for each electrolytic capacitor. The results are shown in FIGS. 5a and 5b.

As can be seen in FIGS. 5a and 5b, no difference in capacitor characteristics was observed between samples 1 and 2. Thus, the indirect method for current feeding through a feed solution can also be employed in this invention, as well as the direct method for current feeding by means of a feed roller, which is usually used in anodic treatments. Preferably, the above-mentioned indirect method is used when a spark accident may occur because of high contact resistance between the porous oxide film of electrode foil and the feed roller.

Although the foregoing Example only discloses the case where oxalic acid is used in an aqueous solution for the first anodic treatment, similar results can also be obtained when surfuric acid is used.

EXAMPLE 4

The following Example shows that the electrode foil prepared by the process of this invention has excellent resistance to water.

Samples 1 to 3 of the electrode foil were prepared as follows. An etched aluminum base foil was subjected to a first anodic treatment in an aqueous solution of oxalic acid at 20° C. at a current density of 0.1 A/cm² for 7 minutes, followed by a second anodic treatment in an aqueous solution of boric acid at 90° C. up to an electric potential of 300 $V_F$. The concentration of oxalic acid was 30 g/l and the concentration of boric acid was 100 g/l. Sample 1 was obtained by immersing the treated aluminum foil in a 5% aqueous solution of phosphoric acid at 50° C. for 2 minutes. Sample 2 was obtained by immersing the treated aluminum foil in a 5% aqueous solution of diammonium hydrogen phosphate at 50° C. for 2 minutes. Sample 3 was obtained by immersing the treated aluminum foil in a 5% aqueous solution of ammonium dihydrogen phosphate at 50° C. for 2 minutes.

Samples 1, 2, and 3 prepared in this manner were boiled in purified water for 2 hours. The withstand voltage was determined for each of these samples before and after boiling. The results are shown in Table 2, in terms of a ratio $\Delta V_M$ of the withstand voltage before and after boiling in purified water.

TABLE 2

| Sample No. | $\Delta V_M$ |
| --- | --- |
| 1 | 0.98 |
| 2 | 0.99 |
| 3 | 0.99 |

As can be seen from Table 2, no deterioration by boiling in purified water was observed in all the samples. Thus, any of the phosphate treatments of this Example can confer excellent water resistance on the electrode foil.

EXAMPLE 5

The following Example shows the influence of experimental conditions for the first anodic treatment on the water resistance of an electrode foil.

The various samples were prepared in the same manner as in Example 4, except that the temperature of the aqueous solution of oxalic acid used in the first anodic treatment as well as the concentration of oxalic acid in this aqueous solution was varied in a certain range.

The samples so prepared were subjected to boiling treatment in the same manner as in Example 4. The withstand voltage was determined for each of these samples before and after boiling treatment. The results are shown in FIG. 6, in terms of a withstand voltage ratio $\Delta V_M$.

Figure 6:
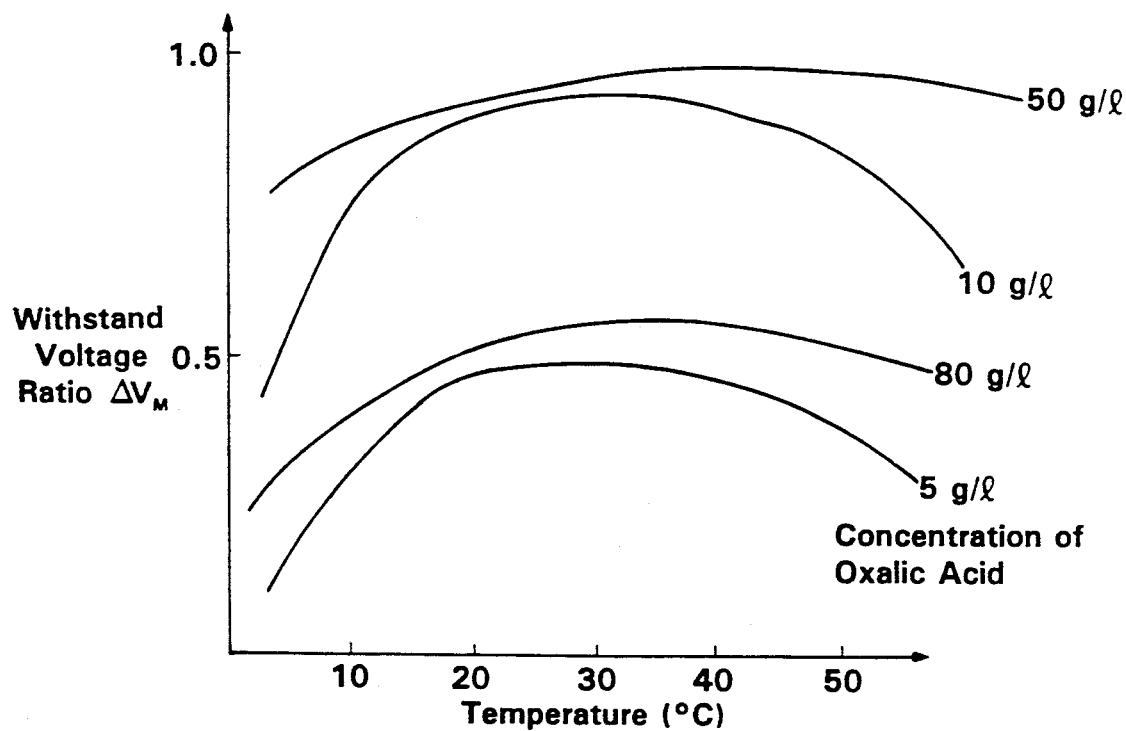
FIG. 6 is of characteristic curves showing the temperature dependence of the withstand voltage ratio with regard to four samples of electrode foil of Example 5, which are prepared by anodic treatment in an aqueous solution of oxalic acid at a given concentration.

As can be seen from FIG. 6, excellent water resistance was obtained in the range of 10 to 50 g/l for the concentration of oxalic acid and in the range of 20° to 50° C. for the temperature of the aqueous solution. Thus, it is preferred that an aluminum base foil is subjected to a first anodic treatment under these conditions, that is, in a concentration of oxalic acid of 10 to 50 g/l and at a temperature of 20° to 50° C.

Although the foregoing Example discloses the results obtained when the aqueous solution of oxalic acid was used, similar results can also be obtained when an aqueous solution of sulfuric acid is used.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A process for preparing an electrode foil for use in aluminum electrolytic capacitors, consisting essentially of the steps of: subjecting an aluminum base foil to a first anodic treatment in an anodizing bath containing an aqueous solution of oxalic acid or sulfuric acid; subjecting the base foil after the first anodic treatment to a second anodic treatment in an anodizing bath containing an aqueous solution of boric acid or adipic acid; and immersing the base foil after the second anodic treatment into an aqueous solution of phosphoric acid or a salt thereof in the absence of applied electric current.

2. A process for preparing an electrode foil for use in aluminum electrolytic capacitors according to claim 1, wherein said aqueous solution used in the third step contains orthophosphoric acid, diammonium hydrogenphosphate, or ammonium dihydrogenphosphate.

3. A process for preparing an electrode foil for use in aluminum electrolytic capacitors according to claim 1, wherein said aqueous solution used in the first step contains oxalic acid or sulfuric acid in a concentration of 10 to 50 g/l and is kept at a temperature of 20° to 50° C.

4. A process for preparing an electrode foil for use in aluminum electrolytic capacitors according to claim 1, wherein in at least one of the first and second anodic treatments, a direct current is allowed to flow between said aluminum base foil as an anode and a counter electrode.

5. A process for preparing an electrode foil for use in aluminum electrolytic capacitors, consisting essentially of the steps of: subjecting an aluminum base foil to a first anodic treatment in an anodizing bath containing an aqueous solution of oxalic acid or sulfuric acid; subjecting the base foil after the first anodic treatment to a second anodic treatment in an anodizing bath containing an aqueous solution of boric acid or adipic acid; and immersing the base foil after the second anodic treatment into an aqueous solution of phosphoric acid or a salt thereof in the absence of applied electric current, wherein in at least one of said first and second anodic treatments, a direct current is allowed to flow between the aluminum base foil as an anode and a counter electrode by indirectly feeding said direct current to the aluminum base foil with a feed bath other than the anodizing baths, said feed bath containing an aqueous solution of ammonium adipate.

* * * * *